United States Patent [19]
Yazami et al.

[11] Patent Number: 5,543,021
[45] Date of Patent: Aug. 6, 1996

[54] NEGATIVE ELECTRODE BASED ON PRE-LITHIATED CARBONACEOUS MATERIAL FOR A RECHARGEABLE ELECTROCHEMICAL LITHIUM GENERATOR

[75] Inventors: Rachid Yazami, Saint-Nazaire-Les-Eymes; Michel Moreau, Clichy, both of France

[73] Assignee: Le Carbone Lorraine, Courbevoie, France

[21] Appl. No.: 512,621

[22] Filed: Aug. 8, 1995

[30] Foreign Application Priority Data

Sep. 1, 1994 [FR] France .................................. 94 10675

[51] Int. Cl.$^6$ .................................................. C25B 11/12
[52] U.S. Cl. ...................... 204/294; 429/218; 423/445 R
[58] Field of Search .......................... 204/294; 429/218; 423/445 R

[56] References Cited

U.S. PATENT DOCUMENTS

| | | | |
|---|---|---|---|
| 4,551,220 | 11/1985 | Oda et al. | 204/294 |
| 4,614,692 | 9/1986 | Kajiyama et al. | 429/44 |
| 5,160,415 | 11/1992 | Kondo et al. | 204/294 |
| 5,348,818 | 9/1994 | Asami et al. | 423/445 R |
| 5,484,520 | 1/1996 | Mochida et al. | 423/445 R |

*Primary Examiner*—Bruce F. Bell
*Attorney, Agent, or Firm*—Dennison, Meserole, Pollack & Scheiner

[57] ABSTRACT

The subject of the present invention is an electrode based on carbonaceous material for rechargeable electrochemical lithium generators. The carbonaceous material is a pitch coke with a mosaic texture subjected to a pre-lithiation treatment before the production of the electrode. The carbonaceous material is preferably a coal tar pitch coke with a mosaic texture. The specific reversible capacities are greater than 400 mAh/g.

9 Claims, No Drawings

NEGATIVE ELECTRODE BASED ON PRE-LITHIATED CARBONACEOUS MATERIAL FOR A RECHARGEABLE ELECTROCHEMICAL LITHIUM GENERATOR

BACKGROUND OF THE INVENTION

1. Field of the Invention

The present invention relates to an electrode based on carbonaceous material, for a rechargeable electrochemical lithium generator.

2. Description of Related Art

Rechargeable electrochemical generators based on alkaline metals, such as lithium generators, have a strong advantage due to their energy density, which is far greater than that of most of the standard electrochemical pairings which operate in aqueous media. Their development, however, has been hindered by the inadequacies of the negative electrode. In effect, metallic lithium reduces the electrolyte, which decomposes during recharging. Thus, an anodic deposit of lithium is observed, which has a powdery, dendritic nature that increases the risk of a short-circuit and leads over time to a substantial loss of reversible capacity. Moreover, the formation of this deposit consumes the electrolyte in an irreversible way, which also limits the life of the generator.

In order to remedy these drawbacks, it has been proposed to use intercalated electrodes which allow the electrode-electrolyte interface to be stabilized. This is particularly the case with electrodes based on carbonaceous material, which are generally composite electrodes.

But during the first charging, the intercalation of lithium into the electrode is carried out correctly only after the passivation of its surface which results from the inevitable reduction of the electrolyte to a low potential. This passivation consumes a large part of the initial capacity of the positive electrode in an irreversible way, which leads to an irreversible loss of capacity of the generator, and consequently, to a low efficiency of the first charge and discharge cycle.

A known solution which makes it possible to avoid the problem of irreversible capacity loss is described in the patent application WO-90/13924. It consists of adding a foil of metallic lithium to the contact of the electrode based on carbonaceous material. This assembly constitutes a local cell which allows the insertion of lithium ions into the electrode as soon as the electrolyte has been introduced. The drawback of this system is that it gives the electrolyte an excessive thickness, which makes the generator difficult to assemble and reduces its energy per unit volume. On the other hand, when the lithium is displaced toward the electrode based on carbonaceous material, the excessive thickness disappears, causing a loosening of the constituents of the generator which is detrimental to its operation.

In the best cases of the prior art, the residual reversible capacity, that is the specific reversible capacity remaining after the first cycle, of the electrodes based on carbonaceous material reaches values which hardly ever exceed 300 mAh/g and the efficiency of the first cycle, that is the ratio between the residual reversible capacity at the first cycle and the initial charge capacity, remains less than 90%.

Accordingly, the object of the present invention is the production of an electrode based on carbonaceous material which has both a residual reversible capacity which is stable and distinctly higher than 300 mAh/g, and an efficiency at the first cycle which is distinctly higher than 90%.

SUMMARY OF THE INVENTION

The principal subject of the present invention is an electrode based on pre-lithiated carbonaceous material for rechargeable electrochemical lithium generators.

Another subject of the present invention is a rechargeable electrochemical generator which contains an electrolyte constituted by a lithium salt in a non-aqueous solvent, a positive electrode, and a negative electrode based on a pre-lithiated carbonaceous material according to the invention.

DESCRIPTION OF THE INVENTION

The electrode based on carbonaceous material according to the invention includes a carbonaceous material and a binder, and is characterized in that this carbonaceous material is a pitch coke with a mosaic texture, and in that it has been subjected to a pre-lithiation treatment, that is, it has been subjected to a lithiation treatment prior to the production of this electrode and the assembly of a generator.

The mosaic texture corresponds to a random discontinuity of the common-orientation zones of the graphene planes.

The carbonaceous material is preferably a coal tar pitch coke with a mosaic texture, and even more preferably, a coal tar pitch coke with a fine mosaic texture, that is, one in which the common-orientation zones of the graphene planes have dimensions less than 5 μm.

In order to increase the capacity of the electrode according to the invention, it is possible to use the carbonaceous material in powder form. Preferably, the average particle size and the specific surface area of the powder of carbonaceous material are, respectively, less than or equal to 10 μm and greater than 5 $m^2/g$. It is also possible to pulverize the powder of carbonaceous material so as to reduce the coherence length to less than 100 nm.

The binder is chosen from among the products generally used for the production of composite electrodes based on carbonaceous material, preferably polyvinylidene fluorides (PVDF), polyoxyethylenes (POE), polyethylenes (PE) and polytetrafluoroethylenes (PTFE).

According to a variant of the invention, in order to improve the electrode's electrical conductivity, the electrode also includes, in addition to the carbonaceous material and the binder, carbon black and/or carbon fibers.

The pre-lithiation treatment can be carried out by any known physical, chemical, or electrochemical means.

It is advantageous to carry out this treatment chemically, that is, through the effect of a chemical reaction. Chemical pre-lithiation advantageously consists of placing the carbonaceous material in contact with a solution of a lithiation agent and an organic solvent which is stable in reduction. The lithiation agent is preferably lithium naphthalene or a normal (N-), secondary (sec-) or tertiary (ter-)butyl lithium. In the case of lithium naphthalene, the organic solvent is preferably tetrahydrofurane (THF); in the case of a butyl lithium, the organic solvent is preferably hexane. The treatment can be carried out at the ambient temperature, but it is possible to raise the temperature in order to accelerate the treatment by means of thermal activation. Preferably, the pre-lithiation is carried out in a neutral atmosphere, such as argon, so as to avoid oxidation of the lithiation agent. This pre-lithiation process has the advantage that it may be carried out at a temperature lower than 100° C.

The rechargeable electrochemical generator according to the invention includes a positive electrode based on a transition metal oxide chosen from among the lithiated cobalt oxides such as $Li_xCoO_2$, lithiated nickel oxides such as $Li_xNiO_2$, lithiated manganese oxides such as $Li_xMnO_2$ or $Li_xMn_2O_4$ and mixtures thereof, and a non-aqueous solvent composed of a mixture of ethers and/or esters, the esters being chosen from among the linear carbonates and the cyclic carbonates, and is characterized in that the negative electrode is an electrode based on carbonaceous material according to the invention.

The tests presented below show that the pre-lithiated carbonaceous materials of the invention lead to residual reversible capacities that are very high (>300 mAh/g), are stable during the charge and discharge cycles, and that also have an efficiency at the first cycle that is far greater than 90%. It is even possible to obtain capacity values greater than 400 mAh/g, which is quite surprising since the value normally attained by a carbonaceous material which forms the compound $LiC_6$, such as graphite, is only 372 mAh/g.

Other characteristics and advantages of the present invention will become apparent with a reading of the following examples, which are illustrative but by no means limitative.

DETAILED DESCRIPTION OF THE INVENTION

EXAMPLE 1

A coal tar pitch coke with a mosaic texture, manufactured by the company Le Carbone Lorraine, was used. It had a fine particle size (4 μm on average) and a relatively high specific surface area (15 m²/g). The coke was treated for 3 hours at 800° C. in $CO_2$, which made it possible to raise its specific surface area to 42 m²/g.

Before utilization, the powder was treated for 15 minutes at 350° C. in air, then vacuum degassed at 300° C. for 10 hours. The coke powder was then pre-lithiated at the ambient temperature in an argon atmosphere with a solution of lithium naphthalene in THF. The duration of the reaction was 7 days. During this period, the sample was maintained in agitation. The pre-lithiated coke powder was then washed several times in THF, then vacuum dried at the ambient temperature. A chemical analysis of the compound showed a C/Li ratio of around 15.

The following operations were carried out in argon.

A mixture of 60% by weight of the pre-lithiated coke powder, 20% by weight of acetylene black, 10% by weight of polyoxyethylene, and 10% by weight of polyethylene, was prepared in the form of a fine powder. The mixture was dispersed in acetonitrile. The excess acetonitrile was evaporated and the mixture was re-ground. The mixture was then placed inside a pelleting machine and compressed at 1.5 tons/cm² to form pellets of 13 mm in diameter.

The pellet was then mounted like an electrode in a button-type generator with a CR 2430 format (diameter 24 mm, thickness 3 mm) in order to be tested in a galvanostatic cycle. This generator included a metallic lithium electrode, a separator of microporous polyethylene marketed under the trademark CELGARD 2502 of Celanese Corporation, and an electrolyte composed of one part by volume propylene carbonate, one part ethylene carbonate, two parts diethyl carbonate, and a lithium salt, $LiPF_6$, at a concentration of 1M. A similar generator, which included the same coal tar pitch coke powder with a mosaic texture, only non pre-lithiated, was also produced.

The galvanostatic cycle test was conducted at a C/20 rating—that is, the generator capacity is restored within 20 hours—which corresponded to a current of 18.6 mA/g for the carbonaceous material or to a current of 17.0 mA/g for the pre-lithiated carbonaceous material. The limit potentials were fixed at 1.2 V/Li for the end of the lithium disintercalation (which corresponded to the discharge of an accumulator using an electrode based on carbonaceous material) and at 0.01 V/Li for the end of the lithium intercalation (which corresponded to the charge of an accumulator using an electrode based on carbonaceous material). Ten cycles were carried out with each generator.

The results obtained are gathered in Table I below, where:

$C_0$ (mAh/g): is the specific capacity which corresponds to the electrochemical pre-disinsertion of the restorable part of the lithium chemically introduced into the carbonaceous material (charge);

$D_1$ (mAh/g): is the specific capacity reached during the first discharge (insertion);

$C_1$ (mAh/g): is the specific capacity restored (or the residual reversible capacity) at the first charge (disinsertion);

$D_{10}$ (mAh/g): is the specific capacity reached during the tenth discharge;

$C_{10}$ (mAh/g): is the specific capacity restored (or the residual reversible capacity) at the tenth charge;

$R_1$ (%): is the efficiency of the first cycle, which is equal to $C_1/D_1$.

In the column "pLi" in Table I, the entry "−" indicates that the pitch coke has not been pre-lithiated; the entry "+" indicates that it has been pre-lithiated.

The electrode according to the invention led to a residual reversible capacity greater than 400 mAh/g, which remained very stable during the charge and discharge cycles. Moreover, the efficiency of the first cycle $R_1$ exceeded 89% for coal tar pitch coke without pre-lithiation and 98% with pre-lithiation.

TABLE I

| Ex. | pLi | $C_0$ | $D_1$ | $C_1$ | $R_1$ | $D_{10}$ | $C_{10}$ |
|---|---|---|---|---|---|---|---|
| 1 | − | — | 392 | 350 | 89 | 351 | 346 |
|   | + | 144 | 433 | 425 | 98 | 427 | 423 |

EXAMPLES 2 THROUGH 4

In order to demonstrate the superior performance of the electrode based on pre-lithiated carbonaceous material according to the invention relative to the prior art and relative to other combinations, comparative tests were conducted, with and without pre-lithiation, using the following carbonaceous materials:

Example 1: coal tar pitch coke with a mosaic texture;

Example 2: a carbon fiber with the label E 105 which originated from a mesophasic tar produced by Dupont De Nemours;

Example 3: a carbon fiber with the label T 300 which originated from a polyacrylonitrile produced by TORAY;

Example 4: natural graphite from Madagascar marked g.n., whose average particle size was around 10 μm.

Example 1, with pre-lithiation, corresponds to the present invention. Examples 2 through 4 do not correspond to the invention.

The generators were produced in the same way as in Example 1.

A galvanostatic cycle test identical to that described in Example 1 was conducted on these generators and the results obtained were gathered in Table II, recapitulated below. In the column "pLi" in Table II, the entry "−" indicates that the carbonaceous material was not pre-lithiated; the entry "+" indicates that it was pre-lithiated.

It is noted that the generator according to the invention (Example 1, with pre-lithiation) produced residual reversible capacities which were both high and stable ($C_{10}$), and efficiencies at the first cycle which were distinctly higher than 90%.

Example 2, which does not correspond to the invention, produced the residual reversible capacity values which remain lower than 400 mAh/g. Example 3, which is also outside the invention, produced an initially low residual reversible capacity, which decreased rapidly, and a low efficiency at the first cycle. Example 4, which is also outside the invention, showed an initial specific capacity ($D_1$) which decreased considerably at the first cycle and which led to a residual reversible capacity which was distinctly lower than that of the electrode according to the invention, and which the pre-lithiation treatment did not allow to increase significantly.

TABLE II

| Ex. | pLi | $C_0$ | $D_1$ | $C_1$ | $R_1$ | $D_{10}$ | $C_{10}$ |
|-----|-----|-------|-------|-------|-------|----------|----------|
| 1   | −   |       | 392   | 350   | 89    | 351      | 346      |
|     | +   | 144   | 433   | 425   | 98    | 427      | 423      |
| 2   | −   |       | 336   | 279   | 83    | 270      | 255      |
|     | +   | 103   | 350   | 324   | 93    | 347      | 313      |
| 3   | −   |       | 247   | 187   | 76    | 180      | 166      |
|     | +   | 49    | 237   | 191   | 81    | 188      | 170      |
| 4   | −   |       | 418   | 295   | 71    | 314      | 292      |
|     | +   | 29    | 322   | 299   | 93    | 316      | 295      |

What is claimed is:

1. An electrode based on carbonaceous material for rechargeable electrochemical lithium generators, comprising a carbonaceous material and a binder, wherein said carbonaceous material is a pitch coke with a mosaic texture pre-lithiated.

2. The electrode according to claim 1, wherein said carbonaceous material is a coal tar pitch coke with a mosaic texture.

3. The electrode according to claim 1, wherein said carbonaceous material is a coal tar pitch coke with a fine mosaic texture, whose common-orientation zones of the graphene planes have dimensions of less than 5 μm.

4. The electrode according to one of claims 1 through 3, wherein said carbonaceous material is in the form of a powder whose average particle size is less than or equal to 10 μm and whose specific surface area is greater than 5 $m^2/g$.

5. The electrode according to one of claims 1 through 3, wherein said electrode includes, in addition to said carbonaceous material and said binder, carbon selected from the group consisting of carbon black and carbon fibers.

6. The electrode according to one of claims 1 through 3, wherein said binder is a polymer-based binder selected from the group consisting of polyvinylidene fluorides (PVDF), polyoxyethylenes (POE), polyethylenes (PE) and polytetrafluoroethylenes (PTFE).

7. The electrode according to one of claims 1 through 3, wherein said carbonaceous material is a chemically pre-lithiated carbonaceous material.

8. The electrode according to claim 7, wherein said chemically pre-lithiated carbonaceous material is derived from contact with a solution of a lithiation agent, selected from the group consisting of lithium naphthalene, N-butyl lithium, a sec-butyl lithium, and a ter-butyl lithium, and an organic solvent which is stable in reduction, selected from the group consisting of tetrahydrofurane (THF) and hexane.

9. A rechargeable electrochemical generator which contains an electrolyte constituted by a lithium salt in a non-aqueous solvent, a positive electrode and a negative electrode, said non-aqueous solvent being composed of a mixture of ethers and/or esters, the esters being chosen from among the linear carbonates and the cyclic carbonates, said positive electrode being based on a transition metal oxide chosen from among the lithiated oxides of cobalt, nickel, manganese, and mixtures thereof, and wherein said negative electrode is an electrode based on pre-lithiated carbonaceous material, according to one of claims 1 through 3.

* * * * *